United States Patent [19]

Keough et al.

[11] 4,022,926

[45] May 10, 1977

[54] LABEL ASSEMBLIES WITHOUT DIE-CUTTING

[75] Inventors: Allen H. Keough, Sudbury; Warren R. Pitts, Needham, both of Mass.

[73] Assignee: Dennison Manufacturing Company, Framingham, Mass.

[22] Filed: Aug. 27, 1976

[21] Appl. No.: 718,413

[52] U.S. Cl. .................................... 428/41; 427/43; 427/44; 427/54; 427/265; 428/354; 428/355; 428/914

[51] Int. Cl.[2] ...................... B32B 3/10; B32B 27/16

[58] Field of Search .................. 428/40, 41, 42, 68, 428/76, 77, 78, 79, 354, 355, 914; 427/36, 37, 44, 54, 265, 43

[56] References Cited

UNITED STATES PATENTS 3,519,525 7/1970 Jackstadt ........................... 428/914

3,989,609 11/1976 Brack ................................. 427/36

*Primary Examiner*—William J. Van Balen

*Attorney, Agent, or Firm*—Kenneth D. Hudson

[57] ABSTRACT

A method for making a novel assembly of laid-on labels, without die-cutting, is described. The method comprises printing over the release surface of a temporary carrier web a liquid pressure-sensitive adhesive in a predetermined pattern of discrete label areas separated by intervening areas of the carrier, solidifying the adhesive surface, forming a continuous film of radiation polymerizable liquid over each adhesive area, the film over each area being unconnected to films over adjacent areas, and exposing the films to radiation sufficient to solidify them by polymerization. Preferably the films extend over the edges of the adhesive and comprise liquids which do not wet the release surface.

22 Claims, 2 Drawing Figures

LABEL ASSEMBLIES WITHOUT DIE-CUTTING

BACKGROUND OF THE INVENTION

This invention relates to an assembly of labels removably adhered in spaced apart relation to the release surface of a carrier web which may be a plastic film but is usually a smooth dense paper coated with a silicone release layer. The labels comprise a pressure-sensitive adhesive in contact with the surface of the release layer and a label base layer, and may include contrasting indicia in one or more colors printed over the label base layer. Labels are sold without indicia, for example ring binder reinforcement rings, patching labels, shipping labels, name tags and the like. Indicia are often employed however and can comprise printed letters, graphics, decorative foils, grain patterns, or the like. Such labels, with or without printed indicia, are referred to as "laid-on" labels and are in wide commercial use for attachment to various articles and materials for purposes of identification, provision of operating characteristics and instructions, hazard warnings, decoration, advertising, protection and repair.

Laid-on labels are presently made by die-cutting which is described, for example, in U.S. Pat. Nos. 2,391,539 and 3,166,186. A sheet or roll of base laminate of coextensive layers comprising the label base, the pressure-sensitive adhesive, and the temporary carrier web having a release surface in contact with the adhesive, is fed through a press. The indicia, if any, are printed and the desired periphery of the individual labels is provided by die-cutting through the overlying layers, but not the carrier web. The surplus material, between labels, is then stripped from the carrier web as a skeleton and is discarded. Protective overcoatings can be applied to the labels before or after stripping of the skeleton.

The base laminate is usually made by coating a carrier web, for example glassine paper, with a liquid silicone resin solution, followed by drying and curing (polymerizing) the silicone resin. A liquid pressure-sensitive adhesive composition, either a molten hot-melt or solvent solution, is then coated over the silicone surface and converted to a plastic solid. The label base layer, for example a printing paper, plastic film, foil or the like, is then laminated to the adhesive. Such base laminates are usually made on large coaters in wide widths and slit into rolls or cut into sheets of sizes suitable for particular press operations.

Die-cutting of labels as described above results in a substantial waste of skeleton materials removed between labels, which can amount to as much as half the starting material. Moreover, provision and operation of the dies, and their maintenance, represents added expense and difficulty. Also, pressure applied in die-cutting the periphery of the labels, or in handling the finished labels, can cause the plastic pressure-sensitive adhesive to ooze beyond the periphery of the label and cause blocking in storage and difficulty in feeding and dispensing the labels. The large coaters and ovens employed are expensive and require relatively large volumes of product for economical operation. Also, high temperatures can damage or limit the selection of the materials employed.

OBJECTS OF THE INVENTION

It is the principal object of the present invention to provide a novel method for making an assembly of laid-on labels which does not require die-cutting, which reduces adhesive ooze, and which avoids the need for large coating and drying equipment to make the starting laminate, together with the novel product resulting therefrom. Further objects include the provision of an improved method which is relatively easy to control, relatively inexpensive, which can be carried out at moderate or ambient temperature, without volatile solvents, in relatively low volumes, and at relatively high speeds.

SUMMARY OF THE INVENTION

According to the present invention, the carrier web having a release surface is mounted in a press or the like having a plurality of printing and/or coating stations and advanced along the feed path through the press. The adhesive is applied as a liquid to the carrier release surface in the predetermined pattern desired for the plurality of labels and then solidified. The label base layer is formed over the adhesive by printing in register or by coating one or more liquid layers over the surface of the adhesive. Liquids which wet the adhesive surface but not the release surface are preferably coated over the surfaces of both the adhesive and exposed intervening areas of the carrier web. The coating wets the surface of the adhesive to form thereover a continuous film but does not wet the exposed release surface where it forms by surface tension a discontinuous film of liquid beads or areas substantially unconnected to the continuous films. The label base layers are rapidly converted from a liquid to a solid by polymerization with radiation, without evolution of solvent, and at moderate temperature, preferably from ambient up to about 200° F. The radiation employed may be any form capable of causing polymerization of the films, such as actinic light, electron beams or the like. Ultraviolet light is preferred and, when employed, the liquid films should include a photoinitiator sensitive to ultraviolet light. Such photoinitiators are known and are described for example, in co-pending application Ser. No. 400,364, more fully identified hereinafter.

Any suitable radiation-polymerizable liquid can be employed to form the label base layer. A copolymerizable mixture of prepolymers and monomers polymerizable by exposure to radiation is preferred. Preferably the monomers are acrylate monomers, including acrylic acid, lower alkyl acrylic acids such as methacrylic acid, and esters thereof. Preferred prepolymers are acrylated epoxy resins or acrylated polyether-polyisocyanate resins. It is preferred that the monomers employed include at least one monomer having three or more acrylate groups to promote rapid cross-linking polymerization, most preferably trimethylolpropane triacrylate.

Acrylated epoxy resins are commercially available as solvent solutions for catalytic curing with heat, for example EPOCRYL 25 A 60 from the Shell Chemical Company. Preferred acrylated polyether-polyisocyanate resins and monomer solutions thereof for radiation curing are more fully described in co-pending application Ser. No. 400,364 by Karl Brack, filed Sept. 24, 1973 and assigned to the same assignee as the present invention, and the disclosure is incorporated herein by reference. Such preferred compositions are therein defined as comprising a liquid prepolymer which is the stepwise reaction product of (a) substantially three mols of a polyisocyanate with (b) substantially one mole of a polyether triol and (c) an unsaturated alcohol selected from allyl alcohol, 5-norbornene-2 methanol and hydroxy lower esters of acrylic or methacrylic acids; and sufficient acrylate ester monomer copolymerizable by radiation with said prepolymer to provide coating viscosity, said monomer including at least one monomer having three or more unsaturated acrylate or methacrylate groups to promote cross-linking. Other radiation polymerizable film-forming resins suitable for use in the present invention are disclosed in U.S. Pat. No. 3,844,916.

Preferably the liquid is of relatively low viscosity, preferably below about 200 seconds as measured with a No. 2 Zahn cup, more preferably below about 100 seconds, and most preferably between about 80 and about 100 seconds. Zahn cups are widely used and are described, for example, in ASTM Special Technical Publication No. 500, "Paint Testing Manual", 13th Edition (1972. Also preferably, the liquid includes a wetting agent promoting the wetting of the surface of the adhesive by the liquid composition. Other compounding materials such as coloring pigments or dyes, leveling and flow-promoting agents, inhibitors, or the like can also be included.

Indicia, where desired, are printed over the solidified surface of the label base layer. Conventional inks may be employed. Radiation curable inks are preferred. Commercially available inks, or inks made by adding coloring agents such as pigments or dyes to the radiation-polymerizable liquids described above can be used.

Other layers employed in labels may also be included if desired, for example, tie-coatings between layers to improve adhesion or overcoatings over the indicia and base layer to add chemical or abrasion resistance.

The pressure-sensitive adhesives can be applied to the carrier release surface as a solvent solution or liquified hot melt, either by printing or by application through a mask, followed by cooling and/or evaporation. Preferably however, they are also printed as radiation-polymerizable liquids, followed by conversion to a plastic solid of conventional form by exposure to polymerizing radiation. Radiation polymerizable pressure-sensitive adhesive liquids are known and are described, for example, in an article entitled: "Radiation Polymerization for Pressure-Sensitive Adhesives", *CHEMTECH*, September, 1974, pages 539–543 and references cited therein. Such adhesives as disclosed include hot melt pressure-sensitive liquids. Preferably however, the pressure-sensitive adhesive liquids used herein are made by incorporating tackifying resins in the radiation-polymerizable acrylate systems described above for use in forming the label base layer films, or by employing suitable acrylic elastomers of the type used in conventional synthetic pressure-sensitive adhesives which have reactive groups copolymerizable by radiation with acrylate monomers.

Where two or more different layers of radiation curable liquids are successively applied, for example the pressure-sensitive adhesive and the label base layer, it is preferred that each be fully polymerized by radiation exposure prior to application of the next layer. However, they can be partially polymerized, including solidification of their surface, by a first exposure prior to application of the next layer, full polymerization being obtained by a subsequent additional exposure to radiation. Higher operating speeds can sometimes be obtained with such multiple exposures, for example, partial polymerizations of individual layers with exposures to ultraviolet light, followed by a final energetic exposure of all layers to an electron beam or the like.

Where multiple applications of substantially the same liquid are applied, for example to form the label base layer films, they may also be individually cured. Preferably however, they are not exposed to polymerizing radiation until all are applied since subsequent applications over a prior liquid film serves to provide a smoother and more uniform coating.

The present method thus comprises as steps advancing a carrier web having a release surface along a path, applying the adhesive to the release surface of the carrier as a liquid in a predetermined pattern of discrete label areas, solidifying at least the adhesive surface, thereafter forming on the carrier web along said path a continuous film of radiation polymerizable liquid over the adhesive at each label area, exposing the liquid film to radiation sufficient to convert them by polymerization to solid layers, the solidified continuous films forming the label base layers over the adhesive, and printing indicia where desired over the label base layers. The liquid films may be printed in register over the adhesive or, as preferred, applied as an overall coating, including the adhesive surface and exposed release surface in intervening areas, where the liquid wets the adhesive but not the release surface. The coating over the release surface forms thereover a discontinuous film of beads or areas of liquid which are substantially unconnected to the continuous films over the adhesive. With either mode of application, the liquid is preferably of sufficiently low viscosity to flow at least partially over the edges of the adhesive to limit, after polymerization, migration or oozing of the adhesive in response to pressure.

DESCRIPTION OF PREFERRED EMBODIMENTS

Figure 1:
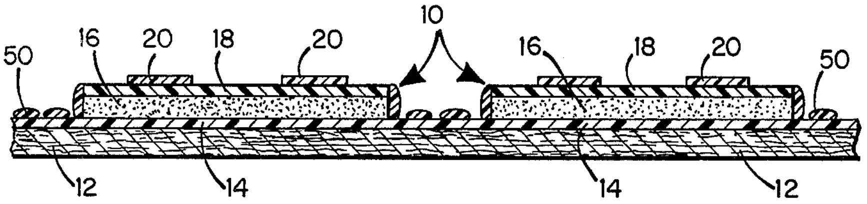
Figure 2:
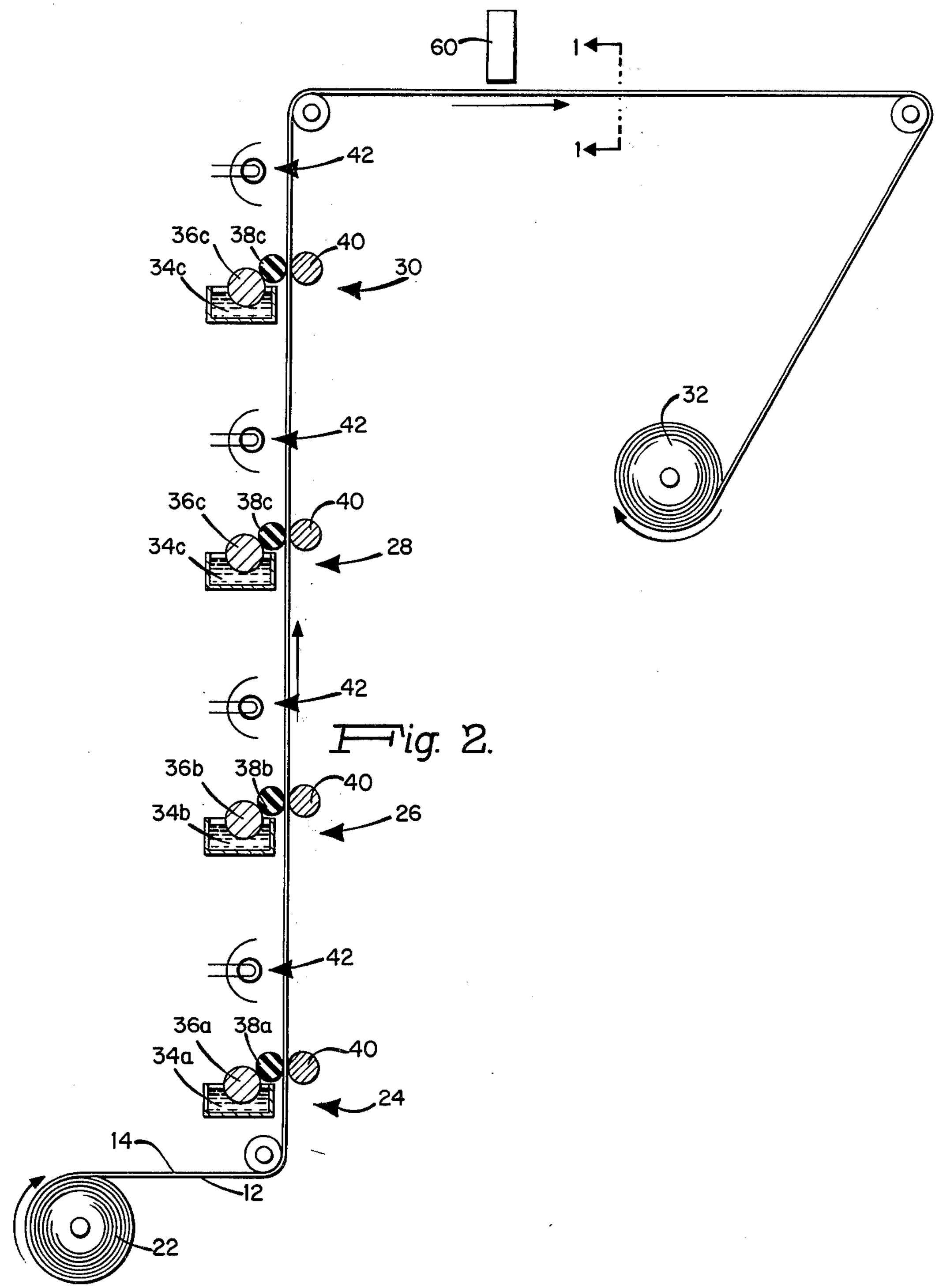

In the accompanying drawing:

FIG. 1 is a longitudinal section on the line 1—1 of FIG. 2 illustrating a carrier web having removably adhered thereon two spaced labels in accordance with the present invention; and, FIG. 2 is a schematic view of apparatus for making the labels shown in FIG. 1.

Referring to the drawings, FIG. 1 illustrates two laid-on labels 10 according to the present invention removably adhered to a temporary carrier paper web 12 having on one surface thereof a release layer of silicone resin 14, the labels 10 comprising a pressure-sensitive adhesive 16, a label base layer 18 and printed indicia 20.

The labels illustrated in FIG. 1 are made by the apparatus and method schematically illustrated in FIG. 2. A storage roll 22 of carrier web 12 of glassine paper or the like having a release coating of silicone resin 14 is unwound, fed along a path through four coating or printing stations 24, 26, 28 and 30 and thereafter wound onto take-up roll 32. The apparatus for unwinding, coating and printing, and rewinding the web can comprise any suitable press, for example a flexographic, rotogravure or rotary screen press. Screen printing is sometimes desirable to print sufficient material and to promote deposition and adhesion of the pressure-sensitive adhesive to the release surface. As is well known, the liquid viscosity should be adjusted to the requirements of the printing or coating techniques employed.

At station 24, a liquid pressure-sensitive adhesive composition is applied from reservoir 34*a* in the predetermined label pattern desired. The adhesive is applied by means of etched roll 36*a* containing etched into its periphery the desired pattern for the labels. The roll 36*a* picks up coating liquid from the reservoir 34*a* and transfers it to transfer roll 38*a*, roll 38*a* in turn transferring the liquid adhesive to the release surface 14 of carrier web 12.

The carrier web with the pressure-sensitive adhesive liquid composition applied is then advanced along the feed path beneath ultraviolet lamp 42 where it is exposed to polymerizing radiation sufficient to convert the liquid to a plastic solid. Any suitable lamp or source 42 can be used, for example an ultraviolet strobe lamp. As illustrated, lamp 42 is a medium pressure, mercury-vapor, Hanovia ultraviolet lamp having an elliptical reflector and an output of about 200 watts per inch. Similarly, pulsed xenon arc lamps having rapid on-off capability are particularly desirable sources of ultraviolet light. Single or multiple lamps can be employed to provide adequate polymerizing radiation at the operating linear web speed employed, preferably 60 feet per minute or more. As illustrated, the source is located at one focus of the elliptical reflector and the web surface at the other focus. The exposure to ultraviolet radiation under first lamp 42 is preferably sufficient to fully polymerize the liquid adhesive composition to a plastic pressure-sensitive solid.

The label base layer 18 is applied as a liquid, radiation-polymerizable liquid at station 26. Station 26 comprises a liquid reservoir 34*b*, etched Anilox coating roll 36*b*, hard rubber transfer roll 38*b* and steel back-up roll 40. The liquid is applied as an overall coating to both the solidified surfaces of the adhesive 16 and to the release surface 14 exposed between adhesive areas, normal printing or coating pressure being employed. The liquid applied wets the adhesive surface and forms a continuous film thereover but does not wet the release surface where it forms by surface tension a discontinuous film of liquid beads or areas 50 substantially unconnected to the continuous films over the adhesive. The liquid can be uncolored but normally will contain pigments and/or dyes to provide the desired background color for the label.

As illustrated, the base layer is applied in a single station 26. If desired, however, the coating can be applied in two or more applications. A plurality of applications, where the press employed has sufficient stations, can provide a more uniform and smoother coating. Where multiple applications are employed, it is sometimes advantageous to apply decreasing amounts of coating in each subsequent application. The capacities of the coating rolls are selected to provide the desired film thickness, for example from less then 1 to about 3 mils. Sufficient thickness to provide the requisite strength and appearance should be employed but excess should be avoided for reasons of economy and to obtain rapid cure.

The films applied are then advanced beneath a second ultraviolet lamp 42 and are partially or preferably fully polymerized to solid layers forming the label base layers 18 of the labels 10. Again, single or multiple lamps can be used. It should be noted that, as shown in FIG. 1, the label base layer 18 extends at least partly over the edges of the adhesive 16 to reduce or eliminate oozing of the adhesive by pressure applied in handling, or dispensing the labels. A low coating viscosity together with good wetting properties promotes the flow of the continuous films over the adhesive edges.

Indicia 20 are then printed over the polymerized surface of base layer 18 at stations 28 and 30, each of which comprises an ink reservoir 34*c*, a printing roll 36*c*, a transfer roll 38*c* and a back-up roll 40. As illustrated, radiation polymerizable inks are preferably employed and are polymerized by exposure to additional ultraviolet lamps 42. A greater or lesser number of printing stations can be employed, normally one station for each color desired. Conventional non-radiation polymerizing inks can be used. Also, other known printing apparatus can be employed.

The radiation supplied by lamps 42 must be sufficient to solidify the surface of each layer applied prior to application of a different layer thereover. If the radiation is insufficient to fully polymerize any of the layers, a final exposure may be supplied at 60 which may be an intense ultraviolet source or an electron beam source.

The finished label stocks is then wound into a non-blocking roll 32. They may also be cut into sheets for stacking. Individual labels can be dispensed from the carrier web by hand or by automatic labeling equipment, for example, by passing the carrier web over a sharp edge.

Preferred coating compositions to form label base layers 18 are given in Examples 1 and 2 below wherein all parts are by weight, Example 1 being most preferred.

EXAMPLE 1

| | |
|---|---|
| VORACRYL AR-700 | 75 |
| 2-ethylhexyl acrylate | 25 |
| Benzoin isobutyl ether | 12 |

VORACRYL AR-700 is an acrylated polyether-polyisocyanate prepolymer in monomer solution prepared according to Example 3 of the previously described copending application Ser. No. 400,364 of Karl Brack. Benzoin isobutyl ether is a photoinitiator added for polymerization with ultraviolet light. Example 1 was applied over adhesive 16 and cured under lamp 42 at 100 feet per minute. When coloring pigments and/or dyes are included, additional exposure may be required, depending on the coloring agents and amounts employed.

EXAMPLE 2

| | |
|---|---|
| EPOCRYL 25 A 60 | 26.8 |
| Trimethylolpropane triacrylate | 26.8 |
| 1,6 hexanediol diacrylate | 26.8 |
| ACTOMER X-70 | 6.7 |
| Silane A-174 | 2.1 |
| HALOCARBON Oil No. 437 | 0.52 |
| Benzoin isobutyl ether | 12.4 |

EPOCRYL 25 A 60 is an acrylated epoxy prepolymer in volatile solvent of the Shell Chemical Corp. After mixing with the 1,6 hexanediol diacrylate, the non-reactive solvent originally present in the EPOCRYL 25 A 60 is preferably removed under vacuum and the remaining ingredients added and mixed thoroughly. Silane A-174 is a methacryl oxypropyl trimethoxy silane from the Union Carbide Co., Actomer X-70 is an acrylated epoxidized soybean oil from the Union Carbide Co., and Halocarbon Oil 437 is a waxy, halogenated hydrocarbon of the Halocarbon Products Corp. A small amount of wetting agent to improve wetting of the adhesive surface can also be included, for example about 0.07 parts of Zonyl FSN of DuPont. The Silane A-174 and Halocarbon Oil 437 are added as leveling and flow-promoting agents to improve the uniformity of coating. A small amount of inhibitor, for example p-methoxy phenol, can be added to prevent premature polymerization and improve pot life. The photoinitiator is preferably added immediately prior to application.

Example 2 was coated over the adhesive 16 and cured under lamp 42 at 60 feet per minute. Again, where coloring agents are added, additional radiation exposure may be required.

The inks employed to print indicia 20 can comprise any ink commonly used to print labels, including known radiation curable inks, and may be used in one or more colors. Preferably they are the liquids specified in Examples 1 or 2, colored by addition of suitable coloring agents, for example pigments or dyes.

As previously described, the pressure-sensitive adhesive 16 can be printed as a molten hot-melt adhesive and solidified by cooling. Alternatively a conventional pressure-sensitive adhesive solution can be applied through a mask, for example a release carrier sheet provided with cutouts of the desired label pattern, the mask being thereafter removed and the solvent evaporated. More preferably, however, the adhesive is applied as shown as radiation-polymerizable liquid, for example those disclosed in the previously cited CHEMTECH publication. Most preferred for this invention are liquid, radiation-polymerizable, pressure-sensitive adhesive forming compositions prepared by adding tackifying agents to the formulations given in Examples 1 and 2 above, or compositions prepared by forming a solution in acrylate monomers of suitable elastomeric polyacrylate polymers having terminal groups copolymerizable with the monomers. Such polymers are known and are used in commercial, solvent-applied acrylic pressure-sensitive adhesives.

EXAMPLE 3

| | |
|---|---|
| Liquid of Example 1 | 112 |
| Tackifying resin EHBC | 65 |

Resin EHBC is a commercially available low molecular weight polyvinyl ethyl ether of the Union Carbide Corp. Other known tackifying resins can be employed. Example 3 was applied and polymerized at 100 feet per minute under lamp 42.

It should be understood that the foregoing description is for the purpose of illustration and that the invention includes all modifications and equivalents within the scope of the appended claims.

What is claimed is:

1. The method of making, without die-cutting, a series of discrete laid-on labels removably adhered to a temporary carrier web having a release surface, said labels being spaced apart on said carrier web in a predetermined pattern of label areas and intervening areas separating adjacent label areas, each label comprising a pressure-sensitive adhesive in removable contact with said release surface and a label base layer over said adhesive, said method comprising:

a. advancing said carrier web along a path;
b. applying said adhesive in liquid form to said carrier release surface in said predetermined pattern of label areas;
c. solidifying at least the surface of said adhesive;
d. thereafter forming over the surface of said adhesive in each label area a continuous film of radiation polymerizable liquid, the film over each area being substantially unconnected to the films over adjacent areas; and,
e. exposing said polymerizable liquid to radiation sufficient to convert it by polymerization to a solid, the polymerized continuous film forming said label base layer over said adhesive.

2. The method according to claim 1 wherein said continuous liquid film extends at least partially over the marginal edges of the said solidified adhesive.

3. The method according to claim 1 wherein said liquid adhesive is applied as a molten hot-melt adhesive which is solidified by cooling.

4. The method according to claim 1 wherein said liquid adhesive is applied as a radiation polymerizable liquid and is solidified by exposure to polymerizing radiation.

5. The method according to claim 1 wherein said liquid film is applied to the surface of said adhesive by printing in register therewith.

6. The method according to claim 1 wherein said continuous film of radiation polymerizable liquid is formed over the surface of said adhesive, and a discontinuous film thereof is formed over the exposed release surface of said intervening areas, by applying to the surfaces of both at least one layer of radiation polymerizable liquid which wets the surface of said adhesive but not the exposed release surface, the liquid forming over said exposed release surface by surface tension beads of liquid substantially unconnected to the continuous films of liquid over said adhesive.

7. The method according to claim 1 comprising the further step of printing indicia over the solidified surface of said label base layer.

8. The method according to claim 4 comprising the further step of printing indicia over the solidified surface of said label base layer.

9. The method according to claim 1 wherein said film is formed by applying a plurality of radiation polymerizable liquid layers over said adhesive.

10. The method according to claim 8 wherein said indicia are printed over said label base layer with radiation-polymerizable ink and comprising the further step of exposing said ink to polymerizing radiation.

11. The method according to claim 4 wherein at least one of said radiation polymerizable liquids is treated with a first exposure to radiation sufficient to partially polymerize it on said web and solidify its surface, and is thereafter treated with a subsequent exposure to radiation sufficient to fully polymerize it.

12. The method according to claim 11 wherein said subsequent exposure is to a polymerizing electron beam.

13. The method of making, without die-cutting, a series of discrete laid-on labels removably adhered to a temporary carrier web having a release surface, said labels being spaced apart on said carrier web in a predetermined pattern of label areas and intervening areas separating adjacent label areas, each label comprising a pressure-sensitive adhesive in removable contact with said release surface and a label base layer over said adhesive, said method comprising:

a. advancing said carrier web along a path;
b. applying said adhesive to the carrier release surface in said predetermined pattern of label areas without application to said intervening areas by printing thereon a liquid polymerizable by radiation to form said adhesive;

c. exposing said liquid to polymerizing radiation sufficient to solidify at least the surface thereof;

d. thereafter forming on said web a continuous film over said adhesive and a discontinuous film over the exposed release surface of said intervening areas by applying to the surfaces of both said adhesive and exposed release surface at least one layer of radiation polymerizable liquid, said liquid wetting the exposed surface of said adhesive but not the exposed release surface, the liquid forming over said exposed release surface by surface tension beads of liquid substantially unconnected to the continuous films of liquid over said adhesive;

e. exposing said liquid continuous films to a source of radiation sufficient to convert them by polymerization to solid layers, the continuous films forming said label base layers over said adhesive; and, f. printing indicia over said label base layers.

14. The method according to claim 13 wherein said indicia are applied to said label base layer with radiation polymerizable ink and comprising the further step of exposing said liquid ink to polymerizing radiation.

15. The method according to claim 13 wherein each of said radiation polymerizable liquids includes a photoinitiator sensitive to ultraviolet light, and wherein said polymerizing radiation is ultraviolet light.

16. An assembly of laid-on labels comprising a temporary carrier having a release surface, and a plurality of discrete labels removably adhered to said release surface, each label comprising a pressure-sensitive adhesive in contact with said release surface and a continuous label base layer over the adhesive, said label base layers extending at least partially over the edges of said adhesive to limit ooze thereof and comprising radiation polymerized polymers, said labels being individually removable from said carrier.

17. An assembly of laid-on labels comprising a temporary carrier web having a release surface, a plurality of discrete labels removably adhered to said release surface, each label comprising a pressure-sensitive adhesive in contact with said release surface and a continuous label base layer over said adhesive, said labels being spaced apart on said carrier in a predetermined pattern of label areas and intervening areas separating adjacent label areas, said label base layers comprising radiation polymerized polymers, and over said intervening areas of the carrier, discontinuous areas of radiation polymerized polymers identical in composition to said label base layers, said discontinuous areas of polymerized monomers being substantially unconnected to said continuous label base layers, said labels being individually removable from said carrier.

18. An assembly of laid-on labels according to claim 17 wherein said continuous label base layer over said adhesive extends at least partially over the edges of the adhesive to reduce oozing thereof in response to pressure.

19. An assembly of laid-on labels according to claim 18 wherein said label base layers and discontinuous areas of polymerized monomers contain the residue of at least one photoinitiator formed by exposure to ultraviolet light.

20. An assembly of laid-on labels according to claim 18 further comprising indicia over said label base layers.

21. An assembly of laid-on labels according to claim 18 wherein said pressure-sensitive adhesive comprises the reaction product of radiation-polymerized monomers and contains the residue of at least one photoinitiator formed by exposure thereof to ultraviolet light.

22. An assembly of laid-on labels according to claim 18 further comprising indicia printed over said label base layers, each of said adhesive, label base layers, discontinuous beads and indicia comprising radiation polymerized monomers and containing the residue of at least one photoinitiator formed by exposure to ultraviolet light.

* * * * *